(12) United States Patent
Shin et al.

(10) Patent No.: US 7,907,839 B2
(45) Date of Patent: Mar. 15, 2011

(54) IMAGE PHOTOGRAPHING DEVICE INCLUDING DIAPHRAGM

(75) Inventors: Kyung-Sik Shin, Yongin (KR); Jeen-Gi Kim, Suwon (KR); Do-Sun Nam, Suwon (KR)

(73) Assignee: Mutas, Suwon (KR)

( * ) Notice: Subject to any disclaimer, the term of this patent is extended or adjusted under 35 U.S.C. 154(b) by 246 days.

(21) Appl. No.: 12/089,389

(22) PCT Filed: Apr. 27, 2006

(86) PCT No.: PCT/KR2006/001585
§ 371 (c)(1),
(2), (4) Date: Apr. 4, 2008

(87) PCT Pub. No.: WO2007/043734
PCT Pub. Date: Apr. 19, 2007

(65) Prior Publication Data
US 2008/0212959 A1 Sep. 4, 2008

(30) Foreign Application Priority Data
Oct. 7, 2005 (KR) .................. 10-2005-0094520

(51) Int. Cl.
*G03B 13/34* (2006.01)
(52) U.S. Cl. ......... 396/133; 396/449; 396/505; 396/508
(58) Field of Classification Search .................. 396/133, 396/439, 449, 451, 505, 510, 508
See application file for complete search history.

(56) References Cited

U.S. PATENT DOCUMENTS

| 4,200,372 A * | 4/1980 | Iwama et al. .................. 396/219 |
| 4,367,931 A * | 1/1983 | Kawai et al. .................. 396/235 |
| 4,695,145 A * | 9/1987 | Kawamoto .................... 396/508 |
| 5,612,740 A * | 3/1997 | Lee et al. ....................... 348/345 |
| 2006/0071151 A1* | 4/2006 | Fukamura et al. ......... 250/214.1 |
| 2008/0080853 A1* | 4/2008 | Tsurukawa ................... 396/529 |

\* cited by examiner

*Primary Examiner* — W. B. Perkey
*Assistant Examiner* — Warren K Fenwick
(74) *Attorney, Agent, or Firm* — Lowe Hauptman Ham & Berner LLP

(57) ABSTRACT

An image photographing device including a lens holder including a lens group and a coil unit that generates an electromagnetic force, a housing into which the lens holder is movably inserted, including a magnet that faces the coil unit, an image sensor, and a diaphragm formed of nonmetal and attached to the housing and elastically supporting the lens holder. Accordingly, the diaphragm has a predetermined elasticity although not reducing the thickness, the lens holder can properly follow the signal of the coil unit, the image photographing device is highly producible, and the possibility that the diaphragm is plastically deformed is small. Also, the terminal of the coil unit is connected to a separate terminal unit installed outside the diaphragm, such that the material used to form the diaphragm can be selected regardless of the conductivity, and foreign materials, such as, flux, can be prevented from contaminating the inside of the device and degrading the quality of an image.

19 Claims, 9 Drawing Sheets

IMAGE PHOTOGRAPHING DEVICE INCLUDING DIAPHRAGM

RELATED APPLICATIONS

The present application is based on, and claims priority from, International Application PCT/KR2006/001585, filed Apr. 27, 2006 and Korea Application Number 10-2005-0094520, filed Oct. 7, 2005, the disclosures of which is hereby incorporated by reference herein in their entirety.

TECHNICAL FIELD

The present invention relates to an image photographing device, and more particularly, a compact image photographing device used in mobile apparatuses, such as, cellular phones.

BACKGROUND ART

With a development of information technology, mobile apparatuses miniaturized to be portable, such as cellular phones, MP3, laptop computers, PDAs, digital camcorders, digital cameras, etc., are receiving much attention from consumers. Digital convergence products which combine several functions lead the market of mobile apparatuses. Most cellular phones are combined with a digital camera module. Cellular phones in which digital camera modules are built as image photographing devices have been improved as greatly as enough to threaten the digital camera market. Recent cellular phones have high-resolution, compact digital camera modules that have several millions of pixels. Although being small, such high-resolution, compact digital camera modules need to be able to execute auto focusing or optical zooming in order to obtain a precise image.

More specifically, in a conventional image photographing device having a relatively small number of pixels, a lens group is fixed in a direction parallel to an optical axis to reduce the manufacturing costs or the size of the image photographing device. The focal point of the lens group is fixed at an initial position, such that when the lens group is out of focus, it is focused by artificially moving the image photographing device and adjusting the distance between the lens group and an object. The conventional image photographing device cannot achieve optical zooming because the lens group is fixed in the direction parallel to the optical axis. The conventional image photographing device controls a photographing magnification by using a digital zooming function in which an optical image captured by the lens group is converted into an electrical signal by an image sensor and the electrical signal is magnified. Recently, a demand for high-quality images increases according to an increase of the number of pixels to about several millions. Image photographing devices having driving mechanisms that can move the lens group in the direction parallel to the optical axis have appeared. Driving mechanisms are classified into piezo type driving mechanisms, linear motor type driving mechanisms, and voice coil type driving mechanisms according to the type of an actuator.

Although such automatic focus control or optical zooming is already popular in existing digital cameras, they are still difficult to be performed in compact digital camera modules whose width and length are reduced to several tens of mm or less. To make the automatic focus control or optical zooming be executed in compact digital cameras, the driving mechanisms need to be extremely improved.

Image photographing devices that perform automatic focus control and optical zooming generally include a lens group, a housing that forms the outer appearance of the image photographing devices, an actuator that moves the lens group in the direction parallel to an optical axis, and a support member that supports the lens group flexibly so is that the lens group can move in relation to the housing. Compact image photographing devices, which are installed in mobile apparatuses, should improve the portability by reducing their sizes and weights and increase the use time of battery by reducing power consumption. Accordingly, the lens group should be small and light, and the power consumed by the actuator should be minimized. The support member should have a minimal elastic coefficient to reduce the driving energy of a lens group having a predetermined size and weight while stably supporting the lens group. The support member is generally a metal plate spring or wire.

For example, an optical pickup device, which reads digital data from an optical disc, includes a lens that projecting a laser beam to the optical disk, a wire that supports the lens so that the lens moves in focusing and tracking directions, and a voice coil attached to a side surface of the lens to generate a driving force. The wire is formed of a conductive material, such as, stainless steel (SUS), yellow copper, or beryllium-copper (BE-CU) alloy. A terminal of the voice coil is soldered to the wire, and the wire is connected to a power unit. Power supplied by the power unit to the wire enters into the voice coil via the soldered portion and the terminal of the voice coil and generates an electromagnetic force required to drive the lens.

In conventional image photographing devices, a mechanism for supporting and driving the lens group which photographs an optical image is similar to that of the aforementioned optical pickup device. Accordingly, the support member of the conventional image photographing devices is formed of a metal and has a shape of a leaf spring or a wire. The leaf spring or the wire has a minimal thickness (e.g., 0.3 mm) to reduce an elastic coefficient. A process, such as, etching, is used to shape metal into a support member having a thickness of 0.3 mm or less. Hence, the yield of the support member is very low when considering the small sizes and thicknesses of the conventional image photographing devices.

When a force exceeding an elastic range is exerted on the metal used to form to the support member, the metal is plastic-deformed. In addition, the metal is prone to fatigue destruction by repetitive load. Suppose that the weight of the lens group, the thickness of the support member, and an electromagnetic force generated by the voice coil are predetermined, the support member should be able to maximize bending or twisting deformation to improve the position controllability along with the optical axis. Accordingly, the support member is designed to have a complicate shape to have various inflection points. The support member having the above-described material, size, and shape in the conventional image photographing devices is plastically deformed when an allowable external force or an excessive current is applied to the voice coil. When the support member is plastically deformed, the conventional image forming device cannot be anticipated to properly operate.

In addition, as the size of an image photographing device is reduced and the number of pixels increases, foreign materials entering the image photographing device degrade the quality of an image. In particular, foreign materials, such as, flux generated during soldering of various components, sensitively affect the quality of an image. There remains a demand for an assembly that can reduce foreign materials, such as, flux, entering an image photographing device.

DISCLOSURE OF THE INVENTION

The present invention provides a compact image photographing device which can reliably execute auto focusing or optical zooming and reduce foreign materials, such as, flux flowing into the device.

According to an aspect of the present invention, there is provided an image photographing device comprising: a lens holder including a lens group and a coil unit that generates an electromagnetic force; a housing, into which the lens holder is movably inserted, including a magnet that faces the coil unit; an image sensor converting an optical image obtained through the lens group into an electrical signal; and a diaphragm attached to the housing, elastically supporting the lens holder which moves in the direction of an optical axis by the electromagnetic force, wherein the diaphragm is formed of nonmetal.

According to another aspect of the present invention, there is provided an image photographing device comprising: a lens holder including a lens group and a coil unit to that generates an electromagnetic force; a housing, into which the lens holder is movably inserted, including a magnet that faces the coil unit; an image sensor converting an optical image obtained through the lens group into an electrical signal; a diaphragm attached to the housing, elastically supporting the lens holder which moves in the direction of an optical axis by the electromagnetic force; and a terminal unit connected to the terminal of the coil unit by being located outside the diaphragm, applying power to the coil unit.

According to another aspect of the present invention, there is provided an image photographing device comprising: a first lens holder including a first lens group and a first coil unit that generates an electromagnetic force, the first lens holder moving in the direction of an optical axis to adjust zooming magnification; a second lens holder including a second lens group and a second coil unit that generates an electromagnetic force, the second lens holder moving in the direction of the optical axis to adjust focusing; a housing, into which the first and second lens holders are movably inserted, including magnets that face the first and second coil units; an image sensor converting optical images obtained through the first and second lens groups into electrical signals; a first diaphragm attached to the housing, elastically supporting the first lens holder which moves in the direction of the optical axis upon control of the magnification of the first lens group; and a second diaphragm attached to the housing, elastically supporting the second lens holder which moves in the direction of the optical axis upon control of the focus of the second lens group, wherein the first and second diaphragms are formed of nonmetal.

BEST MODE FOR CARRYING OUT THE INVENTION

Figure 1:
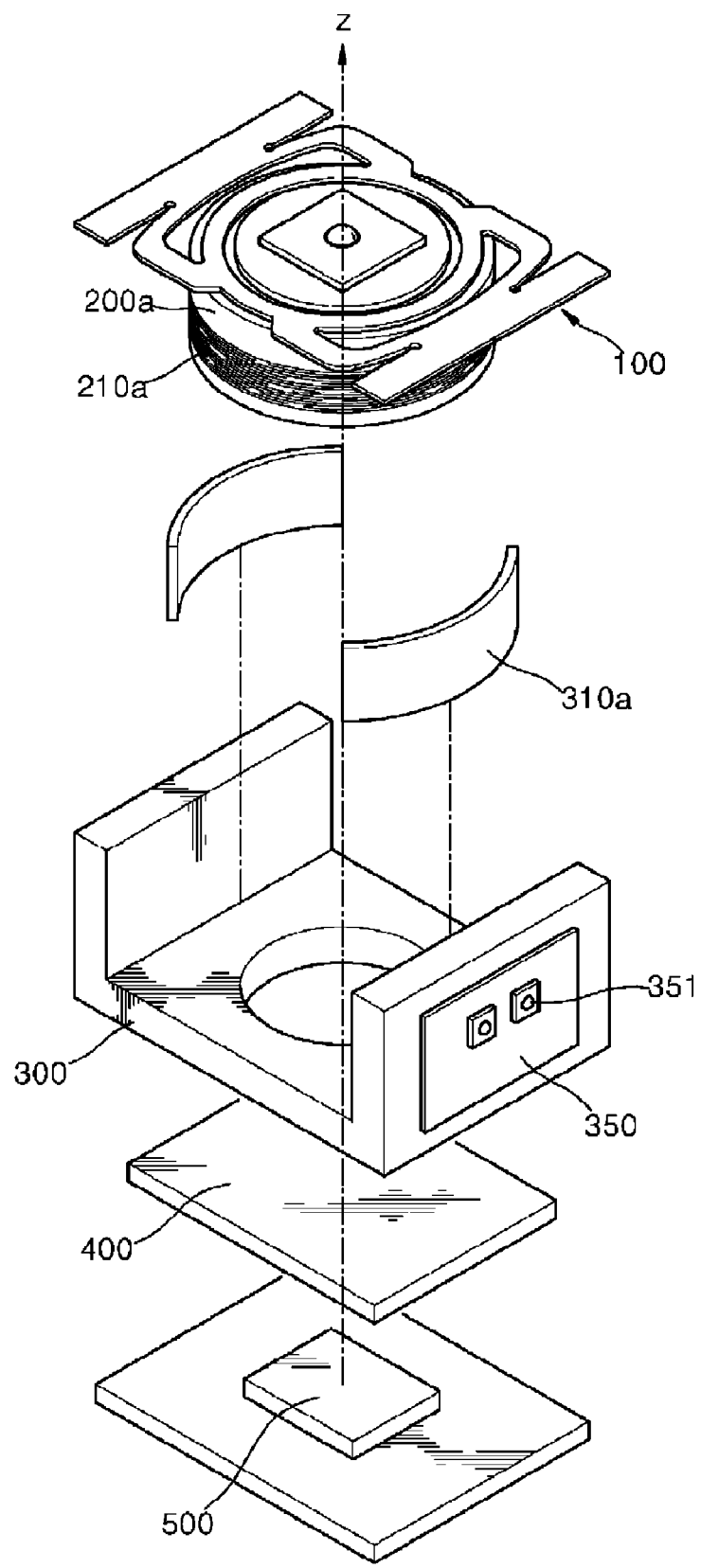
FIG. 1 is an exploded perspective view of an image photographing device according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Like reference numerals in the drawings denote like elements, and thus their description will be omitted.

Figure 2:
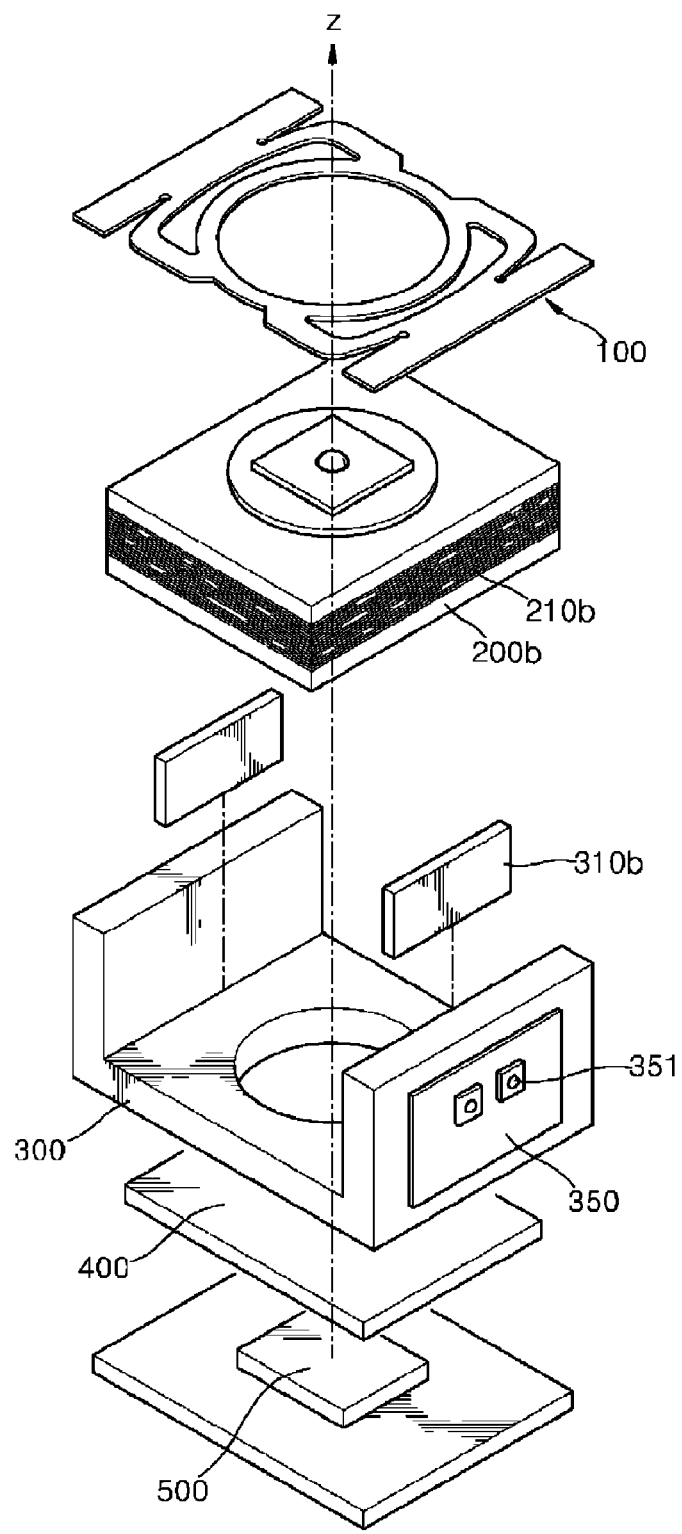
FIG. 2 is an exploded perspective view of an image photographing device according to another embodiment of the present invention.
Figure 3:
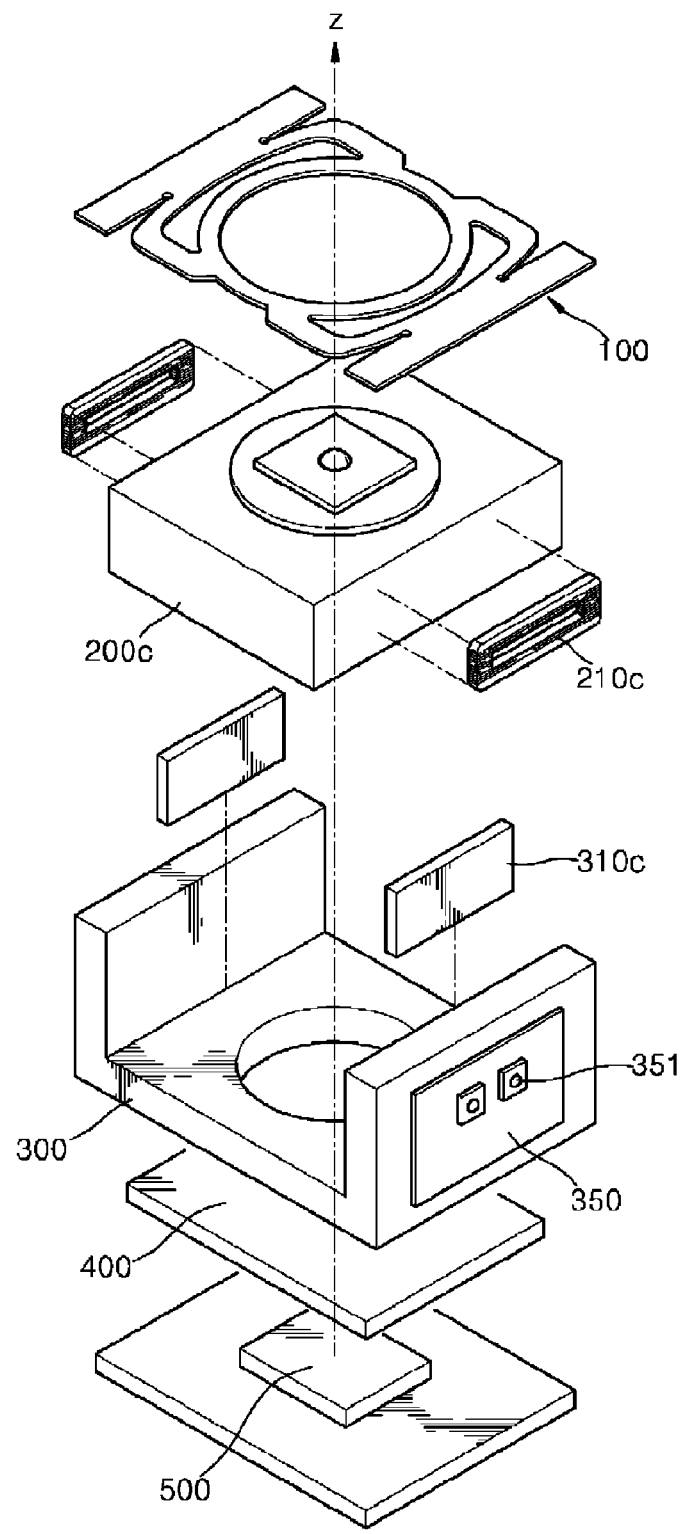
FIG. 3 is an exploded perspective view of an image photographing device according to another embodiment of the present invention.
Figure 4:
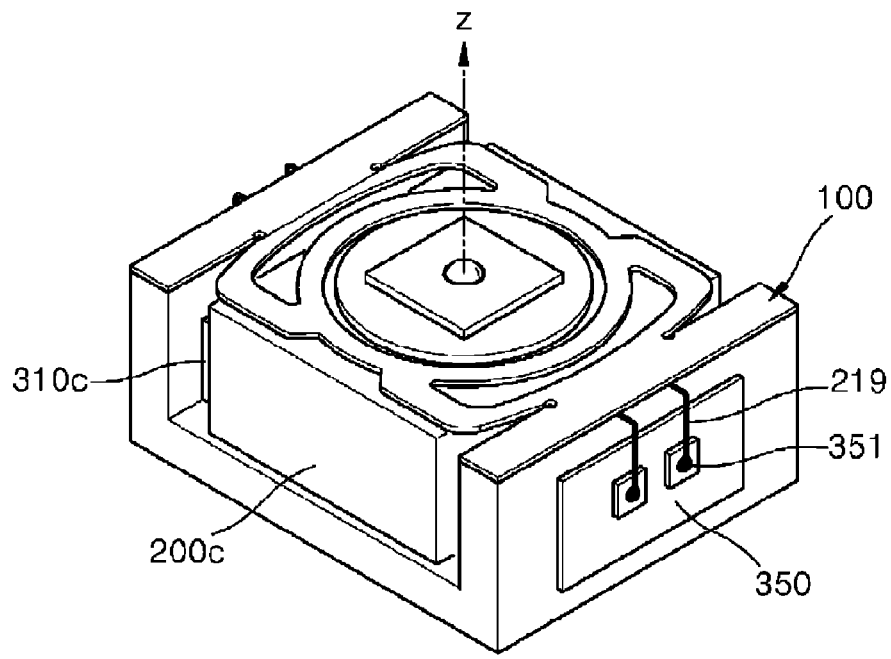
FIG. 4 is a perspective view of an assembled state of the image photographing device shown in FIG. 3.

FIGS. 1 through 3 are exploded perspective views of image photographing devices according to embodiments of the present invention. FIG. 4 is a perspective view of an assembled state of the image photographing device shown in FIG. 3. In FIGS. 1 through 4, compact image photographing devices used in mobile apparatuses, conforming to a digital convergence trend, are illustrated. The image photographing devices of FIGS. 1 through 3 include lens holder 200a, 200b, and 200c, respectively, and each includes a housing 300, an image sensor 500, and a diaphragm 100. Each of the image photographing devices optically photographs an object, converts the optical image into an electrical signal, and transmits the electrical signal to a mobile apparatus.

The lens holders 200a, 200b, and 200c include lens groups (not shown) and coil units 210a, 210b, and 210c, respectively. The lens groups, each including at least one lens, are installed in the lens holders 200a, 200b, and 200c. The coil units 210a, 210b, and 210c generate electromagnetic forces that move the lens holders 200a, 200b, and 200c in the direction of an optical axis. The optical axis denotes a virtual axis along which the optical image travels, namely, an axis Z. The lens holders 200a, 200b, and 200c have various shapes. For example, the lens holder 200a of FIG. 1 is cylindrical, and the lens holders 200b and 200c of FIGS. 2 through 4 are rectangular blocks. The lens holders 200a, 200b, and 200c adjust the focuses of the lens groups by moving in the direction of the optical axis, or perform optical zooming. The coil units 210a and 210b of FIGS. 1 and 2 may be coils wound around the outer circumferences of the lens holders 200a and 200b. The coil unit 210c shown in FIGS. 3 and 4 may include a pair of coil windings located symmetrically about the optical axis.

The housing 300 forms the exterior of each of the image photographing devices. The lens holders 200a, 200b, and 200c are inserted into the housing 300 and move therein. Magnets 310a, 310b, and 310c are installed on the housing 300. The magnets 310a, 310b, and 310c face the coil units 210a, 210b, and 210c and may be permanent magnets. The magnets 310a, 310b, and 310c and the coil units 210a, 210b, and 210c have air gaps therebetween not to contact each other and not to interfere with each other. Yokes (not shown) may be further installed on the housing 300 so as to increase the magnetic fluxes of the magnets 310a, 310b, and 310c. The magnets 310a of FIG. 1 have each a shape of a piece of a cylinder to surround the lens holder 200a. The magnets 310b and 310c are each rectangular. The magnets 310a, 310b, and 310c supply strong, continuous direct-current magnetic fluxes so that the coil units 210a, 210b, and 210c move in the optical axis direction according to the Fleming's left-hand rule. The number of magnets 310a, 310b, and 310c is not fixed. In other embodiments, a magnet may be included in a lens holder, and a coil unit is installed on a housing.

A terminal unit 350 is installed on the housing 300 to apply power to one of the coil units 210a, 210b, and 210c. An end of the coils of one of the coil units 210a, 210b, and 210c is connected to a terminal 351 of the terminal unit 350 and receives power through the terminal unit 350. In one embodiment, the end of the coils may be soldered to the terminal 351. To prevent foreign materials, such as flux produced during soldering, from entering the image photographing devices, the connection of the coil end to the terminal 351 may occur outside the diaphragm 100. Although not shown in the drawings, a part of the coil extending to achieve the connection with the terminal unit 350 may be fixed to the diaphragm 100 by an adhesive.

The image sensor 500 receives the optical image through the lens group and converts the same into an electrical signal. In one embodiment, the image sensor 500 may be a CCD sensor or a CMOS sensor. Since the image sensor 500 has a high sensitivity with respect to infrared rays, an IR filter 400 may be installed between the lens group and the image sensor 500. The IR filter 400 filters out infrared rays that have wavelengths deviating from visible rays, whereby saturation of the image sensor 500 by the infrared rays is prevented.

Each of the lens holders 200a, 200b, and 200c, having certain sizes and weights, is elastically supported by the diaphragm 100. In the image photographing devices according to the present invention, the lens holders 200a, 200b, and 200c perform optical zooming or automatic focusing by adequately moving in the optical axis direction. When no electromagnetic forces are generated by one of the coil units 210a, 210b, and 210c, the diaphragm 100 supports the static load of one of the lens holders 200a, 200b, and 200c. When an electromagnetic force is generated by one of the coil units 210a, 210b, and 210c, the diaphragm 100 is elastically deformed to be in equilibrium with the electromagnetic force and thus moves the lens holders 200a, 200b, and 200c in the direction of the optical axis.

The diaphragm 100 should have predetermined rigidity enough to support the static load of one of the lens holders 200a, 200b, and 200c and elasticity enough to properly move by the electromagnetic force of one of the coil units 210a, 210b, and 210c upon control of the locations of the lens holders 200a, 200b, and 200c. The movement of one of the lens holders 200a, 200b, and 200c in the optical axis direction is longer upon optical zooming for magnification adjustment than upon focusing. Even when the lens holders 200a, 200b, and 200c move by greater distances upon optical zooming than upon focusing, the diaphragm 100 should not be plastically deformed.

However, as described above, a conventional metal support member has many problems in meeting the above requirements. In other words, since a compact image photographing device includes a small support member, the rigidity of the support member accordingly increases to support the static load of the lens holders. To lower the rigidity, the thickness or diameter of the metal support member is reduced in the conventional art. The thickness or diameter reduction leads to an increase of the production costs of the support member and also an increase of the production costs of the image photographing device due to the difficulty of assembly. In addition, the metal support member having a reduced thickness or diameter is too weak for impacts to be destroyed or plastically deformed, resulting in a failure of a normal operation.

In the present invention, a nonmetal material instead of metal used in the convention art is used to form the diaphragm 100. The diaphragm 100, which is formed of nonmetal, has already predetermined elasticity although its thickness is not greatly decreased, and properly moves according to the position-control signal of each of the coil units 210a, 210b, and 210c. Compared to a metal diaphragm, the nonmetal diaphragm 100 has predetermined sufficient elasticity in spite of its large thickness, has high producibility_and sufficient rigidity, and is not easily plastically deformed. In one embodiment, the diaphragm 100 may be formed of one of synthetic resin, rubber, and paper. In one embodiment, the synthetic resin may be one of polymer laminade, polypropylene, HOP, and cross carbon. The diaphragm 100 formed of paper is highly producible because of the easiness of formation and is light and still suitably rigid. The polymer laminade is formed by thinning polymer or coating paper with polymer and is good at following the position-control signals of the coil units 210a, 210b, and 210c. The polypropylene has better rigidity than paper and a good signal-following property. The HOP, which is a kind of synthetic resin, has smaller mass than polypropylene and the same rigidity as polypropylene. The cross carbon also has smaller mass than polypropylene and high rigidity like polypropylene. These materials are frequently used to form an acoustic plate used in an acoustic apparatus, such as, a speaker or an earphone. An acoustic plate included in a speaker or the like converts an electrical signal input to a voice coil into an acoustic wave. The acoustic plate is not plastically deformed when vibrating at a strong output, and exactly follows the electrical signal input to the voice coil and vibrates at a normal output.

Figure 5:
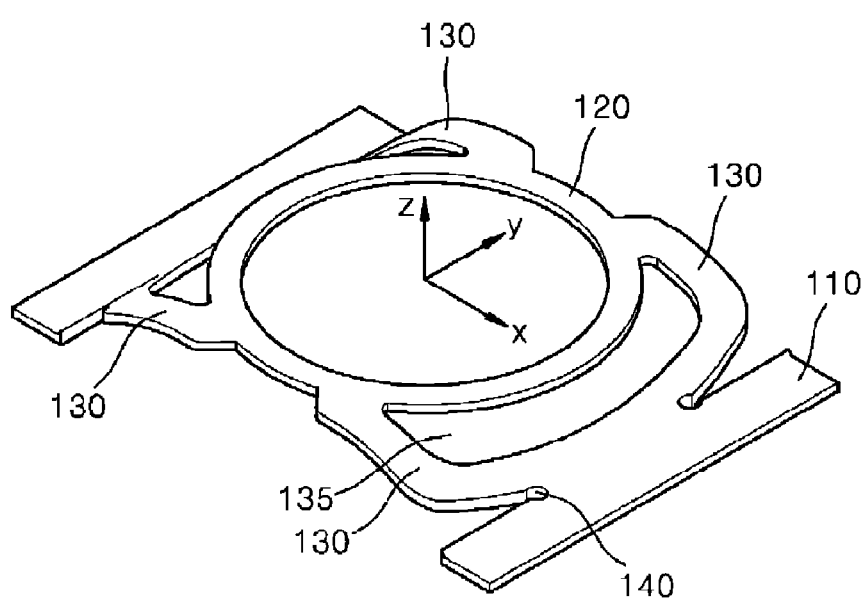
FIG. 5 is a perspective view of an elastically deformed state of a diaphragm included in the image photographing devices shown in FIGS. 1 through 3.
Figure 6:
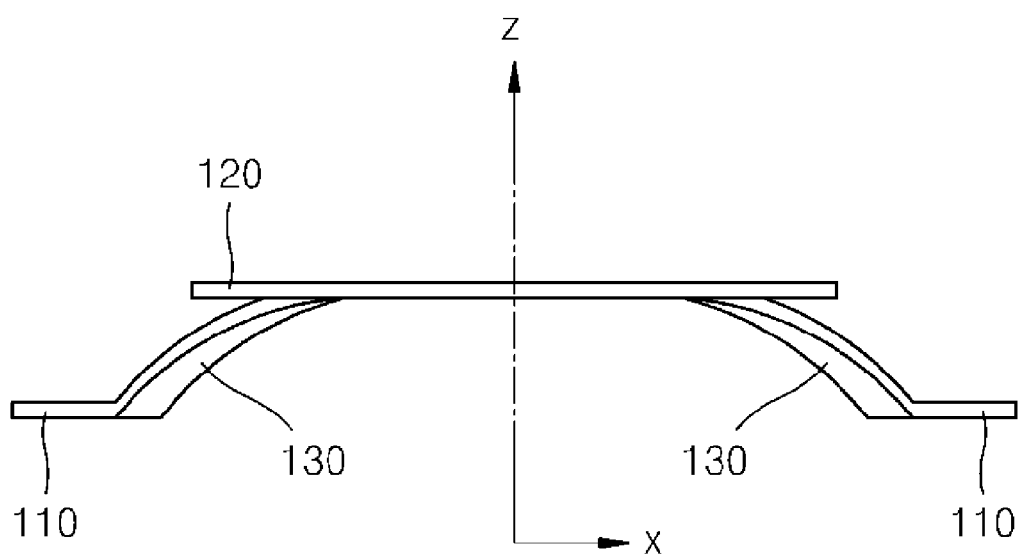
FIG. 6 is a side view of the diaphragm of FIG. 5.

FIG. 5 is a perspective view of an elastically deformed state of the diaphragm 100 included in the image photographing devices shown in FIGS. 1 through 3. FIG. 6 is a side view of the diaphragm 100 of FIG. 5. Referring to FIGS. 5 and 6, the diaphragm 100 includes first surfaces 110 attached to the housing 300, a second surface 120 attached to the lens holders 200a, 200b, and 200c, and bridge surfaces 130. The bridge surfaces 130 may be elastically deformed during movement of the lens holders 200a, 200b, and 200c and generate longitudinal differences in the direction of the optical axis between the first and second surfaces 110 and 120. In the embodiment shown in FIGS. 5 and 6, the first surfaces 110 are symmetrical about a virtual axis y perpendicular to the optical axis z, and the bridge surfaces 130 include two bridge surfaces symmetrical about the virtual axis y and the remaining two bridge surfaces is symmetrical about a virtual axis x perpendicular to the optical axis z. The bridge surfaces 130 support the lens holders 200a, 200b, and 200c while being bent or twisted with respect to portions connected to the first and second surfaces 110 and 120. A bridge hole 135 may be formed between each of the bridge surfaces 130 and the second surface 120. The formation of the bridge hole 135 makes the coefficient of elasticity in the optical axis z be lower than those in the virtual axes x and y. The bridge surfaces 130 restrict the moving direction of the lens holders 200a, 200b, and 200c to one direction, namely, the direction of the optical axis z. The bridge surfaces 130, connecting the first surfaces 110 to the second surface 120 while making curved line shaped connections, have steep inflection points 150 at the centers thereof.

The locations and the number of the inflection points 150 and the angles at which the bridge surfaces 130 are inflected vary according to the amount of movement of the optical axis direction. The bridge surfaces 130 may have C-shaped notches 140 at portions connected to the first surfaces 110. The C-shaped notches 140 prevent the connections from being cracked and facilitate the formation of the diaphragm 100.

Figure 7:
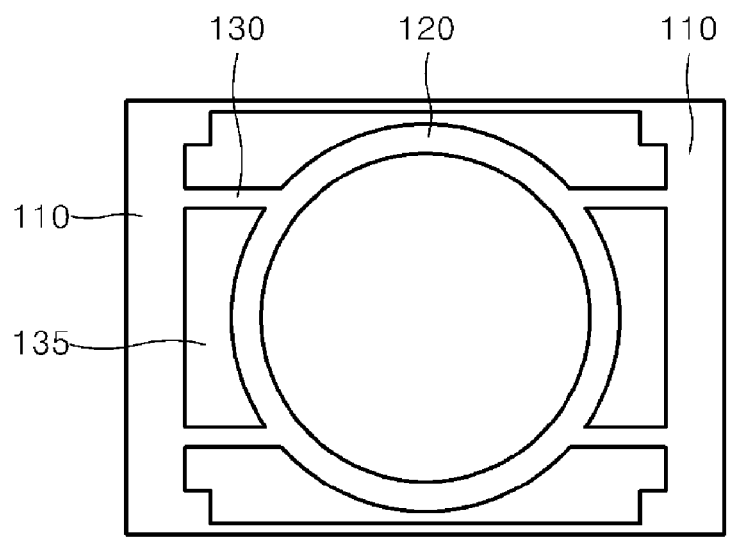
FIGS. 7 through 10 are plan views of modifications of the diaphragm of FIG. 5.
Figure 8:
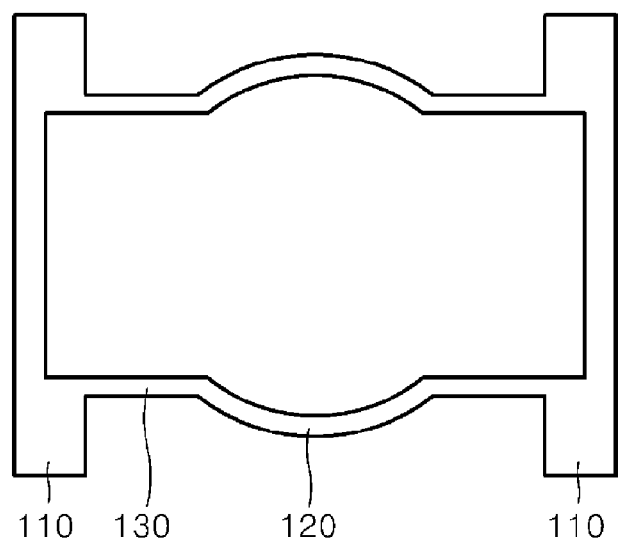

FIGS. 7 and 8 are plan views of a modification of the diaphragm 100. Referring to FIGS. 7 and 8, the bridge surfaces 130 may connect the first surfaces 110 to the second surface 120 while making straight line shaped connections. In this case, the bridge surfaces 130 support the lens holders 200a, 200b, and 200c while being bent with respect to the portions connected to the first and second surfaces 110 and 120.

Figure 9:
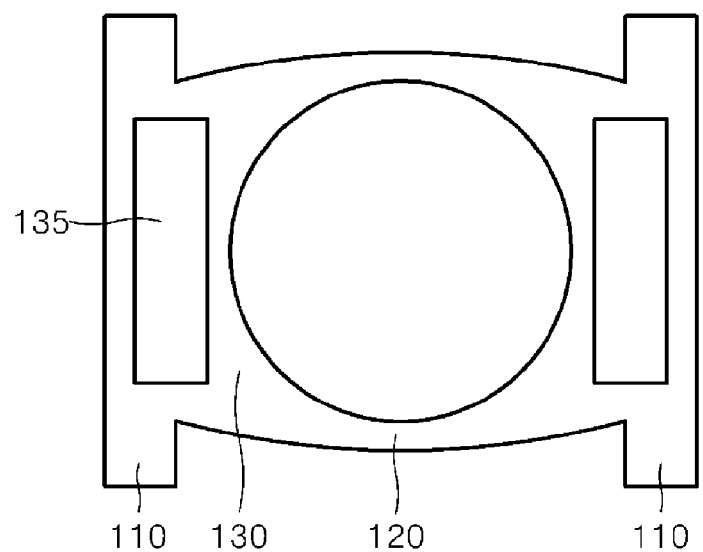
Figure 10:
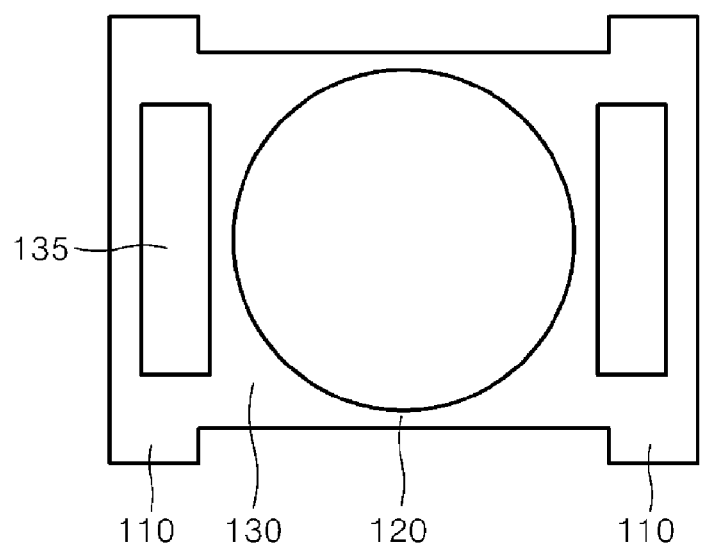

FIGS. 9 and 10 are plan views of another modification of the diaphragm 100. The diaphragm 100 is not limited to the shown embodiments, but may have various shapes according to conditions associated with the support member of the lens holders 200a, 200b, and 200c.

Figure 11:
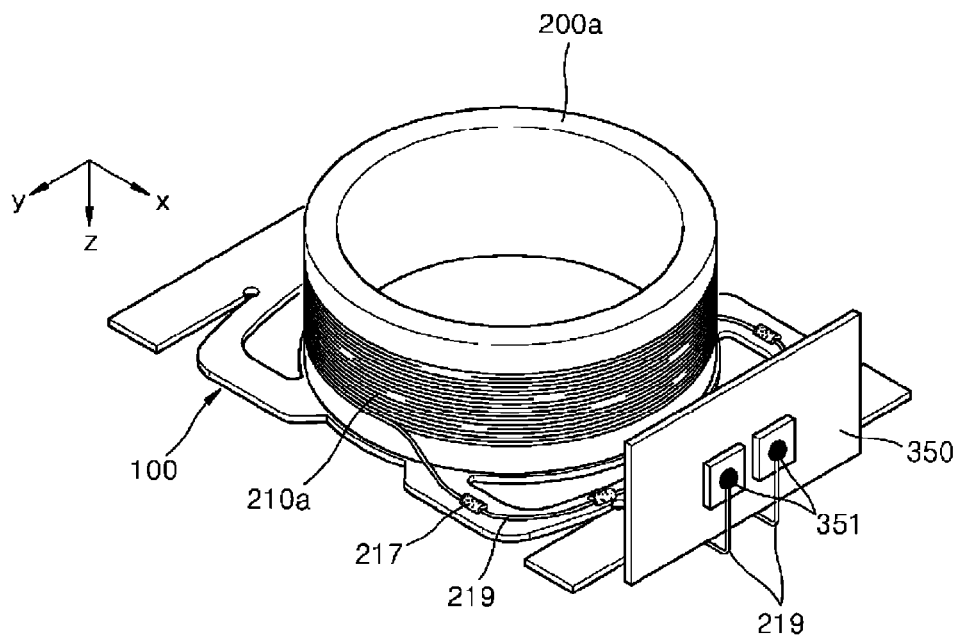
FIG. 11 is a perspective view illustrating a connection of a coil unit and a terminal unit according to an embodiment of the present invention.

FIG. 11 is a perspective view illustrating connections of the coil units 210a, 210b, and 210c to the terminal unit 350, according to an embodiment of the present invention. FIG. 11 is a perspective view illustrating connections of the coil units 210a, 210b, and 210c to the terminal unit 350, according to another embodiment of the present invention. As described above, in a conventional image photographing device, a support member for supporting a lens group is formed of conductive metal, the terminal of a coil for driving the lens group is directly soldered to the support member, and power is connected to the support member and is thus supplied to the coil connected with the support member. Hence, the conductive support member is used in the conventional image photographing device. There are also some limits in that a material having predetermined rigidity and elasticity while having good electrical conductivity should be used to form the support member. However, flux produced during the soldering of the coil flows into the image photographing device, thus possibly degrading the quality of an image.

In the image photographing devices according to the embodiments of the present invention, the terminal unit 305 is installed outside the diaphragm 100, and the terminals of the coils 210a, 210b, and 210c each go outside the diaphragm 100 and are connected to the terminal unit 350. Hence, the material used to form the diaphragm 100 may be selected regardless of conductivity, and the possibility that foreign materials, such as flux produced upon soldering, contaminate the inside of the image photographing devices is low.

Figure 12:
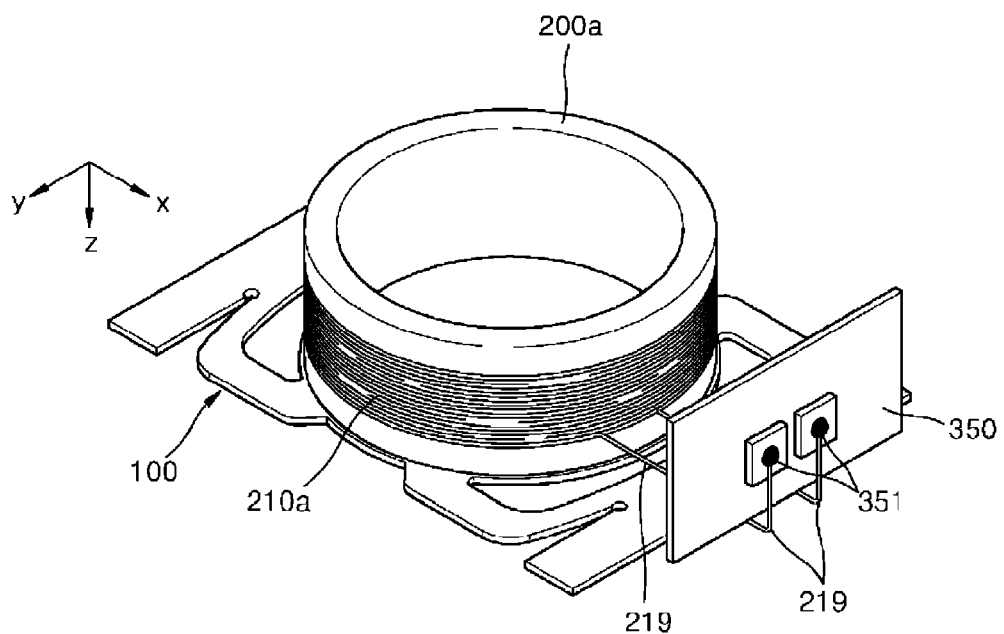
FIG. 12 is a perspective view illustrating a connection of a coil unit and a terminal unit according to another embodiment of the present invention.

As shown in FIGS. 11 and 12, the terminal of each of the coil units 210a, 210b, and 210c may be soldered to the terminals 351 of the terminal unit 350. A separate connector may be used to connect each of the coil units 210a, 210b, and 210c to the terminals 351. As shown in FIG. 11, a part 219 of an extending portion of the coil to be connected to the terminals 351 may be fixed to the diaphragm 100 by an adhesive 219. When a distance between each of the coil units 210a, 210b, and 210c and the terminals 351 is long, the coil portion 219 extending toward the terminals 351 is fixed to the diaphragm 100 by the adhesive 217 as illustrated in FIG. 12, so that contamination of the image photographing devices by foreign materials, such as, flux, can be prevented.

In high-resolution image photographing devices, a lens group needs to be automatically focused to produce a precise image, and an actuator for focusing is needed to move the lens group in the direction of an optical axis. In addition, a lens group including a plurality of lenses is needed to achieve optical zooming, and a zooming actuator to control the distance between lenses is also needed.

Figure 13:
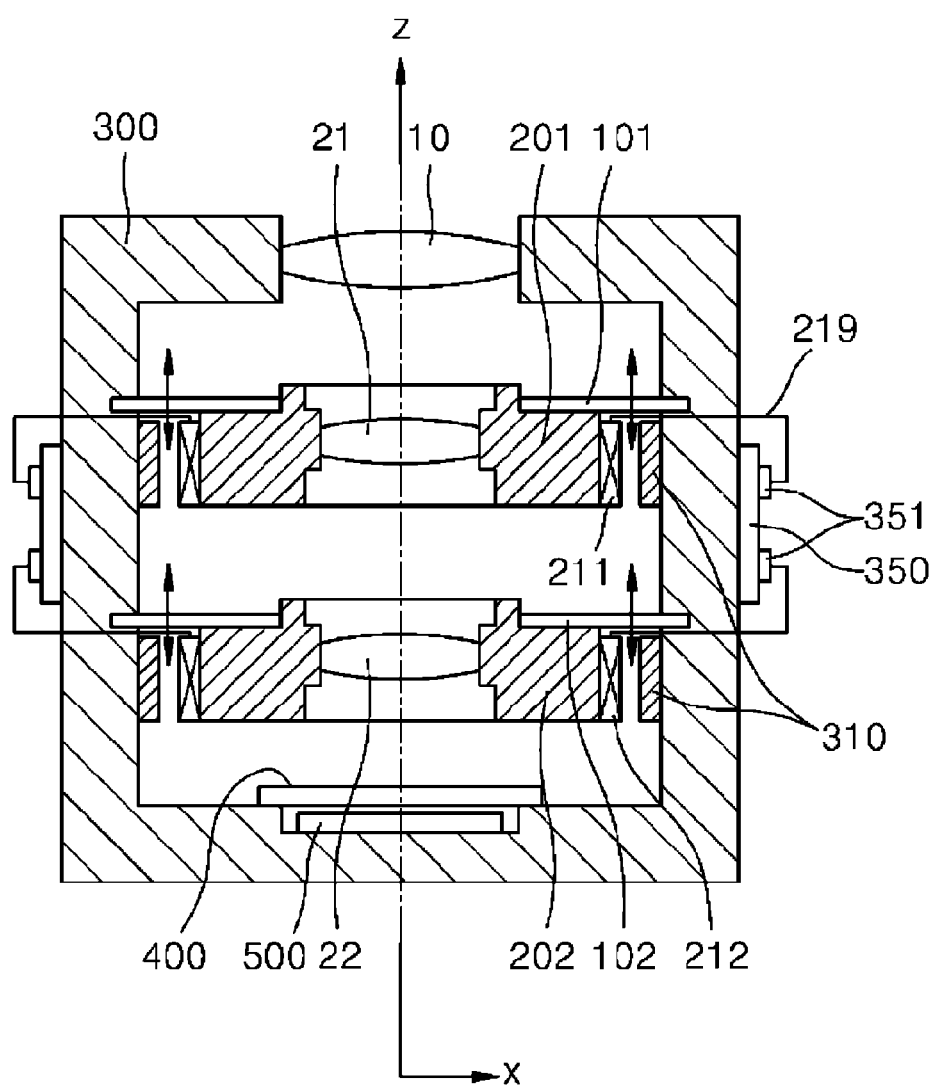
FIG. 13 is a lateral cross-section of an image photographing device capable of adjusting the magnification and focus of a lens group, according to an embodiment of the present invention.

FIG. 13 is a side cross-section of an image photographing device capable of adjusting the magnification and focus of a lens group, according to an embodiment of the present invention. Referring to FIG. 13, the image photographing device includes both a focusing actuator and a zooming actuator.

The image photographing device includes a first lens holder 201, a second lens holder 202, a housing 300, an image sensor 500, a first diaphragm 101, and a second diaphragm 102.

The first lens holder 201 moves in an optical axis direction to perform zooming and includes a first lens group 21 and a first coil unit 211 that generates an electromagnetic force.

The second lens holder 202 moves in the optical axis direction to perform focusing and includes a second lens group 22 and a second coil unit 212 that generates an electromagnetic force.

The first and second lens holders 201 and 202 are inserted into the housing 300 and can move therein. The housing 300 includes magnets 310 disposed to face the first and second coil units 211 and 212.

The image sensor 500 converts optical images produced by the first and second lens groups 21 and 22 into electrical signals.

The first diaphragm 101 is attached to the housing 300 and elastically supports the first lens holder 201 which moves in the optical axis direction upon zooming of the first lens group 21.

The second diaphragm 102 is attached to the housing 300 and elastically supports the second lens holder 202 which moves in the optical axis direction upon focusing of the second lens group 22. The first and second diaphragms 101 and 102 are formed of nonmetal.

An optical signal obtained by photographing an object sequentially passes through a fixed lens group 10, the first lens group 21, and the second lens group 22, is subject to zooming and focusing, and reaches the image sensor 500 via an IR filter 400. The first and second diaphragms 101 and 102, which support the first and second lens groups 21 and 22, respectively, are separately included and perform zooming and focusing independently.

In one embodiment, the image photographing device of FIG. 13 may further include terminal units 350, which apply power to the first and second coil units 211 and 212 and are connected to the terminals 351 of the first and second coil units 211 and 212 by being located outside the first and second diaphragms 101 and 102.

INDUSTRIAL APPLICABILITY

As described above, in an image photographing device according to the present invention, a diaphragm that elastically supports a lens holder upon optical zooming or focusing is formed of nonmetal, so that the diaphragm has a predetermined elasticity although not reducing the thickness, the lens holder can properly follow the signal of a coil unit, the image photographing device is highly producible, and the possibility that the diaphragm is plastically deformed is small. Also, the terminal of the coil unit is connected to a separate terminal unit installed outside the diaphragm, such that the material used to form the diaphragm can be selected regardless of the conductivity, and foreign materials, such as, flux, can be prevented from contaminating the inside of the device and degrading the quality of an image.

Although a few embodiments of the present invention have been shown and described, it would be appreciated by those skilled in the art that changes may be made in these exemplary embodiments without departing from the principles and spirit of the invention, the scope of which is defined in the claims and their equivalents.

The invention claimed is:

1. An image photographing device comprising:
a lens holder including a lens group and a coil unit that generates an electromagnetic force;
a housing, into which the lens holder is movably inserted, including a magnet that faces the coil unit;
an image sensor converting an optical image obtained through the lens group into an electrical signal; and
a diaphragm attached to the housing, elastically supporting the lens holder which moves in the direction of an optical axis by the electromagnetic force,
wherein the diaphragm is formed of nonmetal.

2. The image photographing device of claim 1, wherein while the lens holder is moving in the direction of the optical axis, the magnification or focus of the lens group is adjusted.

3. The image photographing device of claim 2, wherein the diaphragm is formed of at least one of synthetic resin, rubber, and paper.

4. The image photographing device of claim 3, wherein the synthetic resin is at least one of polymer, laminate, polypropylene, HOP, and cross carbon.

5. The image photographing device of claim 1, wherein the diaphragm comprises:
first surfaces attached to the housing;
a second surface attached to the lens holder; and
bridge surfaces connecting the first surfaces to the second surface.

6. The image photographing device of claim 5, wherein the bridge surfaces generate longitudinal differences in the direction of the optical axis between the first surfaces and the second surface.

7. The image photographing device of claim 6, wherein:
the first surfaces are right-left symmetrical to each other on a virtual surface perpendicular to the optical axis; and
the bridge surfaces are right-left and up-down symmetrical to each other on the virtual surface.

8. The image photographing device of claim 7, wherein the bridge surfaces have straight line shapes and connect the first surfaces to the second surface.

9. The image photographing device of claim 7, wherein the bridge surfaces have curved line shapes with steep inflection points formed at centers of the bridge surfaces and connect the first surfaces to the second surface.

10. The image photographing device of claim 9, wherein the bridge surfaces have C-shaped notches at portions connected to the first surfaces.

11. The image photographing device of claim 1, wherein the coil unit is formed by winding a coil around the outer circumference of the lens holder.

12. The image photographing device of claim 1, wherein a pair of coil units are located symmetrically about the optical axis.

13. The image photographing device of claim 1, further comprising a terminal unit which applies power to the coil unit and is connected to a terminal of the coil unit by being located outside the diaphragm.

14. The image photographing device of claim 13, wherein the terminal of the coil unit is soldered to the terminal unit.

15. The image photographing device of claim 14, wherein a portion of the coil unit extending to be connected to the terminal unit is fixed to the diaphragm by an adhesive.

16. An image photographing device comprising:
a lens holder including a lens group and a coil unit that generates an electromagnetic force;
a housing, into which the lens holder is movably inserted, including a magnet that faces the coil unit;
an image sensor converting an optical image obtained through the lens group into an electrical signal;
a diaphragm attached to the housing, elastically supporting the lens holder which moves in the direction of an optical axis by the electromagnetic force; and
a terminal unit connected to a terminal of the coil unit by being located outside the diaphragm, applying power to the coil unit.

17. The image photographing device of claim 16, wherein the terminal of the coil unit is soldered to the terminal unit.

18. The image photographing device of claim 17, wherein a portion of the coil unit extending to be connected to the terminal unit is fixed to the diaphragm by an adhesive.

19. An image photographing device comprising:
a first lens holder including a first lens group and a first coil unit that generates an electromagnetic force, the first lens holder moving in the direction of an optical axis to adjust zooming magnification;
a second lens holder including a second lens group and a second coil unit that generates an electromagnetic force, the second lens holder moving in the direction of the optical axis to adjust focusing;
a housing, into which the first and second lens holders are movably inserted, including magnets that face the first and second coil units;
an image sensor converting optical images obtained through the first and second lens groups into electrical signals;
a first diaphragm attached to the housing, elastically supporting the first lens holder which moves in the direction of the optical axis upon control of the magnification of the first lens group;
a second diaphragm attached to the housing, elastically supporting the second lens holder which moves in the direction of the optical axis upon control of the focus of the second lens group, and
terminal units which apply power to the first and second coil units and are connected to terminals of the first and second coil units by being located outside the first and second diaphragms,
wherein the first and second diaphragms are formed of nonmetal.

* * * * *